United States Patent
Umemura

(10) Patent No.: US 11,075,398 B2
(45) Date of Patent: Jul. 27, 2021

(54) CELL PACK AND METHOD FOR PRODUCING UNIT CELL FOR USE IN CELL PACK

(71) Applicant: Toyota Jidosha Kabushiki Kaisha, Toyota (JP)

(72) Inventor: Koji Umemura, Okazaki (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 236 days.

(21) Appl. No.: 16/193,596

(22) Filed: Nov. 16, 2018

(65) Prior Publication Data

US 2019/0157709 A1 May 23, 2019

(30) Foreign Application Priority Data

Nov. 21, 2017 (JP) .............................. JP2017-223697

(51) Int. Cl.

| | |
|---|---|
| *H01G 11/78* | (2013.01) |
| *H01G 11/26* | (2013.01) |
| *H01G 11/86* | (2013.01) |
| *H01G 11/10* | (2013.01) |
| *H01G 11/58* | (2013.01) |
| *H01M 10/04* | (2006.01) |

(Continued)

(52) U.S. Cl.
CPC ........ *H01M 10/0481* (2013.01); *H01G 11/10* (2013.01); *H01G 11/26* (2013.01); *H01G 11/58* (2013.01); *H01G 11/78* (2013.01); *H01G 11/86* (2013.01); *H01M 10/0587* (2013.01); *H01M 10/4207* (2013.01); *H01M 50/20* (2021.01); *H01M 2220/20* (2013.01)

(58) Field of Classification Search
CPC ......... H01M 10/0481; H01M 10/4207; H01M 2/1077; H01M 10/0587; H01M 2220/20; H01G 11/10; H01G 11/78; H01G 11/26; H01G 11/86; H01G 11/58; H01G 11/82; H01G 11/84; Y02T 10/70; Y02E 60/13
See application file for complete search history.

(56) References Cited

U.S. PATENT DOCUMENTS

2010/0167116 A1* 7/2010 Okada ................. H01M 50/578
429/158
2012/0129038 A1* 5/2012 Lim .................... H01M 50/463
429/156

(Continued)

FOREIGN PATENT DOCUMENTS

JP 2010080203 A 4/2010
JP 2012113961 A 6/2012

(Continued)

*Primary Examiner* — Lisa S Park
(74) *Attorney, Agent, or Firm* — Dinsmore & Shohl LLP

(57) ABSTRACT

A cell pack including: a plurality of unit cells arranged in an arrangement direction, each unit cell including a cell case accommodating an electrode body and an electrolytic solution; and a spacer disposed between two unit cells adjacent to each other in the arrangement direction. The cell case has a side surface facing the spacer. At least one of the side surfaces has a pressing region pressed by the spacer and a non-pressing region not pressed by the spacer. An expanding portion bulging in a direction of approaching the spacer is provided in the non-pressing region of the cell case, and a gap between the cell case and the spacer is reduced by the expanding portion.

13 Claims, 13 Drawing Sheets

(51) Int. Cl.
*H01M 10/0587* (2010.01)
*H01M 2/10* (2006.01)
*H01M 10/42* (2006.01)
*H01M 50/20* (2021.01)

(56) References Cited

U.S. PATENT DOCUMENTS

2012/0244420 A1* 9/2012 Serizawa ............... H01M 2/02
                                                        429/163
2018/0309103 A1   10/2018 Kobayashi et al.

FOREIGN PATENT DOCUMENTS

| JP | 2012-230837  | * | 11/2012 |
|----|--------------|---|---------|
| JP | 2012230837 A |   | 11/2012 |
| JP | 2013093225 A |   | 5/2013  |
| JP | 2014035867 A |   | 2/2014  |
| JP | 2015088408 A |   | 5/2015  |
| JP | 2016184470 A |   | 10/2016 |
| JP | 6180887 B2   |   | 8/2017  |
| JP | 2018181765 A |   | 11/2018 |

* cited by examiner

CELL PACK AND METHOD FOR PRODUCING UNIT CELL FOR USE IN CELL PACK

CROSS REFERENCE TO RELATED APPLICATIONS

This application claims the benefit of priority to Japanese Patent Application No. 2017-223697 filed on Nov. 21, 2017, the entire contents of which are hereby incorporated herein by reference.

BACKGROUND OF THE DISCLOSURE

1. Field

The present disclosure relates to a cell pack and a method for producing a unit cell for use in the cell pack.

2. Background

A cell pack in which a plurality of unit cells is electrically connected is widely used as a high-output power source for driving a vehicle and the like (see, for example, Japanese Patent Application Publications No. 2012-113961, No. 2012-230837, and No. 2016-184470). For example, Japanese Patent Application Publication No. 2012-113961 discloses a cell pack having a plurality of unit cells arranged in a predetermined arrangement direction, one or a plurality of spacers disposed between two unit cells adjacent to each other in the arrangement direction, and a restraining mechanism that applies a load to the unit cells and the spacer(s) from the arrangement direction. The unit cell includes an electrode body in which a positive electrode and a negative electrode face each other in a state of insulation from each other, an electrolytic solution, and a cell case accommodating the electrode body and the electrolytic solution. The spacer has a plurality of protruding ribs on a surface facing the unit cell. In the cell pack disclosed in Japanese Patent Application Publication No. 2012-113961, a load is applied to the entire electrode body from the arrangement direction by the ribs of the spacer. Therefore, the electrode body in the cell case is pressed with a uniform force so that the positive electrode and the negative electrode are pressed against each other. As a result, dimensional changes of the electrode body in the arrangement direction are suppressed and bulging of the cell is suppressed at the time of charging and discharging or the like.

In addition, Japanese Patent Application Publication No. 2012-230837 indicates that a spacer is brought into contact with a part of a cell case so that a part pressed by the spacer and a part not pressed by the spacer are provided in the cell case. According to Japanese Patent Application Publication No. 2012-230837, because of such a configuration, a high load is applied to a region including both end portions of the electrode body and not including the central portion, thereby improving high-rate charge/discharge characteristics.

SUMMARY

However, according to the investigation conducted by the inventor of the present disclosure, when a cell pack is used, the internal pressure of a cell case fluctuates due to the difference in temperature and difference in altitude in the use environment, or because of cyclic charging and discharging. At this time, as described in Japanese Patent Application Publication No. 2012-230837, when there is a portion to be pressed by the spacer and a portion not to be pressed by the spacer to the cell case, stress concentrates in the portion which is not pressed, so that local "cell bulging" occurs in the portion which is not pressed. When such cell bulging occurs repeatedly, the cell case is fatigued. The resulting problem is that the airtightness of the cell is lowered due to cracks occurring at places which are the starting points of the bulging deformation, more specifically, in the vicinity of the boundary between the portion of the cell case which is pressed and the portion of the cell case which is not pressed.

Further, in recent years, the thickness (plate thickness) of the cell case has been decreased to reduce cost and weight. Specifically, in contrast to the thickness of the conventional cell case of about 1 mm or more, for example, 1 mm to 3 mm, a reduction in the thickness of the cell case to 0.5 mm or less, for example, to 0.3 mm to 0.5 mm, has recently been studied. Since such a thin-walled cell case can be easily deformed by internal pressure fluctuation, the above-mentioned problem is likely to occur.

The present disclosure has been made in view of the above circumstances, and an object thereof is to provide a cell pack having excellent durability against internal pressure fluctuation in a cell case. Another related object is to provide a method for producing a unit cell for use in this cell pack.

According to the present disclosure, there is provided a cell pack comprising: a plurality of unit cells arranged in an arrangement direction, each unit cell including an electrode body having a positive electrode and a negative electrode, an electrolytic solution, and a cell case accommodating the electrode body and the electrolytic solution; one or a plurality of spacers which is disposed between two unit cells adjacent to each other in the arrangement direction and has a protruding portion protruding toward the unit cell on at least one surface facing the unit cell; and a restraining mechanism that applies a load from the arrangement direction to the plurality of unit cells and the one or plurality of spacers. The cell case has a side surface facing the spacer. At least one of the side surfaces has a pressing region pressed by the spacer and a non-pressing region not pressed by the spacer. An expanding portion bulging in a direction of approaching the spacer is provided in the non-pressing region of the cell case, and a gap between the cell case and the spacer is reduced by the expanding portion.

In this configuration, the expanding portion is provided in the non-pressing region of the cell case, and the gap between the cell case and the spacer in the non-pressing region is narrower than in the related art. As a result, it is possible to disperse the stress caused by the internal pressure fluctuation in the cell case, thereby significantly suppressing the cell bulging in the non-pressing region. Therefore, even when stress caused by internal pressure fluctuation is repeatedly applied, the cell case is unlikely to be fatigued. As a result, it is possible to realize a cell pack that is superior in durability against internal pressure fluctuation as compared with a cell pack in which the gap between the cell case and the spacer is wide in the non-pressing region.

In some embodiments, the electrode body has a reaction portion in which the positive electrode and the negative electrode face each other in the arrangement direction in a state of insulation from each other. The non-pressing region of the cell case is provided at least in a lower portion up to $\frac{1}{3}$ from the lower end toward the upper end of the reaction portion in the vertical direction. With such a configuration, the non-pressing region functions as a liquid holding space (so-called liquid reservoir) for holding the electrolytic solution in the electrode body. As a result, in the cell pack having the above configuration, the electrolytic solution is unlikely to be pushed out of the electrode body even when high-rate charging/discharging is repeated. Therefore, it is possible to realize a cell pack having excellent high-rate cycle characteristics.

In some embodiments, the pressing region of the cell case is provided with a length such that, when a direction orthogonal to a vertical direction of the side surfaces is taken as a width direction, both end portions in the width direction of the reaction portion are pressed over the entire length in the vertical direction. With such a configuration, the pressing region functions as a stopper wall that suppresses the movement of the electrolytic solution to the outside of the electrode body. As a result, it is possible to realize a cell pack which further excels in high-rate cycle characteristics. Further, due to the pressing region, dimensional changes of the electrode body in the arrangement direction is unlikely to occur and cell bulging is suppressed. Further, for example, at the time of overcharging, displacement and shrinkage of the separator are suppressed, and internal short-circuiting of the electrode body is unlikely to occur. Therefore, with the above configuration, it is possible to realize a cell pack excellent in at least one of, for example, high-rate charge/discharge characteristics, high-rate cycle characteristics, and overcharge resistance.

In some embodiments, a maximum height of the expanding portion is the same as a height of the protruding portion of the spacer; and the expanding portion of the cell case is in contact with the spacer when the unit cell is in a predetermined fully discharged state. With such a configuration, it is possible to better disperse the stress caused by internal pressure fluctuation in the cell case, thereby further suppressing the cell bulging in the non-pressing region. Therefore, the effect of the present disclosure can be exhibited at a higher level.

In some embodiments, the electrode body is a wound electrode body of a flat shape which is obtained by laminating the positive electrode and the negative electrode in in a state of insulation from each other and winding the laminate. The wound electrode body has a pair of wound flat portions and a pair of wound R portions interposed between the pair of wound flat portions. One of the pair of wound R portions is disposed on a lower side in the vertical direction, and the pair of wound flat portions is arranged along the side surface of the cell case. With such a configuration, the wound R portion disposed on the lower side can serve as a receiving tray for the electrolyte solution and it is possible to prevent the electrolytic solution from flowing out from the lower end of the electrode body. Therefore, it is possible to realize a cell pack in which the electrolytic solution is better held in the electrode body and which has excellent high-rate cycle characteristics.

In some embodiments, a thickness of each of the side surfaces of the cell case is 0.5 mm or less. With such a thin-walled cell case, the above-described problem caused by internal pressure fluctuation is particularly likely to occur. Therefore, when the cell case is thin, the application of the present disclosure exerts a better effect.

According to the present disclosure, there is also provided a method for producing a unit cell to be used in constructing the cell pack. The production method includes: a first step of constructing an assembled body by inserting the electrode body into the cell case; a second step of, subsequent to the first step, restraining the assembled body in a state where the assembled body faces the spacer, and applying a pressure to an interior of the cell case, thereby forming, in the cell case, an expanding portion along a shape of the spacer; and a third step of, subsequent to the second step, injecting the electrolytic solution into the cell case in which the expansion part has been formed. With such a production method, a unit cell to be used for constructing a cell pack can be produced in an easy manner.

The above and other elements, features, steps, characteristics and advantages of the present disclosure will become more apparent from the following detailed description of the embodiments with reference to the attached drawings.

DETAILED DESCRIPTION OF THE EMBODIMENTS

Figure 1:
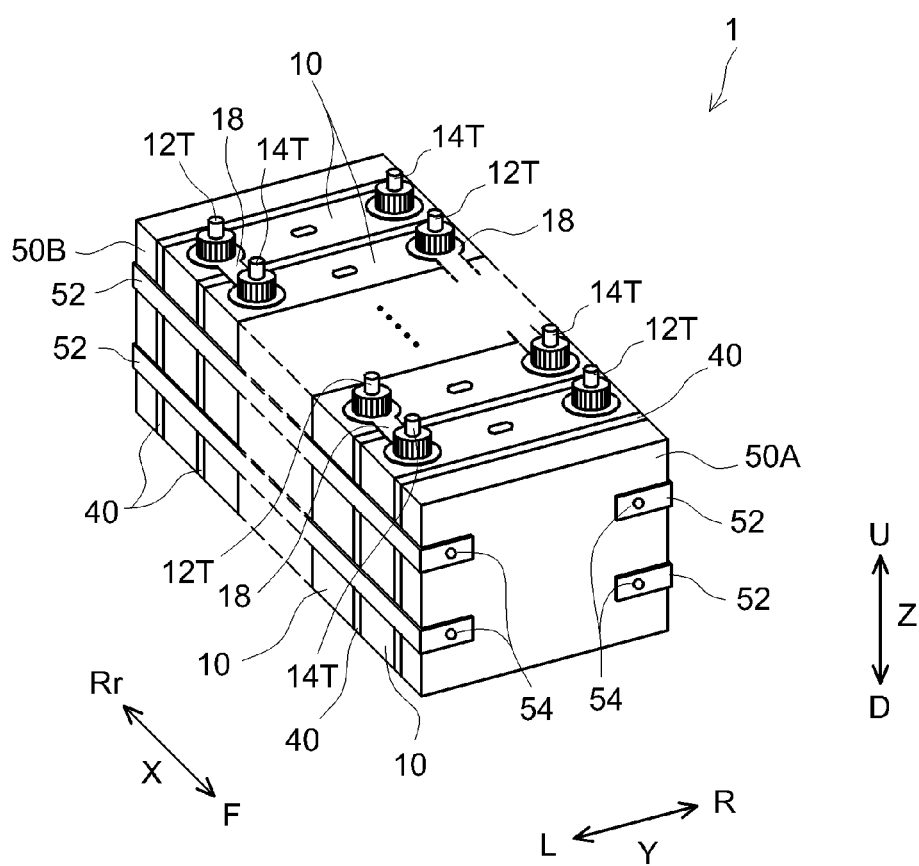
FIG. 1 is a perspective view schematically illustrating a cell pack according to one embodiment.

Hereinafter, embodiments of the cell pack disclosed herein will be described with reference to the drawings as appropriate. It is to be understood that the embodiments described herein are not intended to limit the disclosure in any way. The cell pack disclosed herein can be implemented based on the contents disclosed in this specification and technical common knowledge in the relevant field.

Further, in the following drawings, the same reference numerals are given to the members/parts that exhibit the same action, and redundant explanation may be omitted or simplified. The symbols U, D, F, Rr, L, and R in the drawings mean up, down, front, rear, left, and right, respectively. The symbols X, Y, Z in the drawings mean the arrangement direction of the cells, the width direction of the long side surface of the unit cell, and the vertical direction of the unit cell, respectively. However, these are merely for convenience of explanation and do not limit the mode of installation of the cell pack at all.

Cell Pack

FIG. 1 is a perspective view schematically illustrating a cell pack 1. A cell pack 1 includes a plurality of unit cells 10, a plurality of spacers 40, a pair of end plates 50A, 50B, and a plurality of restraining bands 52. The pair of end plates 50A, 50B is disposed at both ends of the cell pack 1 in a predetermined arrangement direction X (the front-rear direction in FIG. 1). The restraining bands 52 are attached so as to bridge the pair of end plates 50A, 50B. The plurality of unit cells 10 is arranged in the arrangement direction X. The plurality of spacers 40 is arranged in the arrangement direction X between the plurality of unit cells 10 and between the unit cells 10 and the end plates 50A, 50B.

The end plates 50A, 50B sandwich the plurality of unit cells 10 and the plurality of spacers 40 in the arrangement direction X. The plurality of restraining bands 52 is fixed to the end plates 50A, 50B by a plurality of screws 54. Each of the restraining bands 52 is attached so that a prescribed restraining pressure is applied in the arrangement direction X. The restraining bands are attached, for example, so that the surface pressure in a region of the unit cell 10 pressed by the spacer 40 is approximately 90 kgf/cm$^2$ to 600 kgf/cm$^2$, for example, approximately 200 kgf/cm$^2$ to 500 kgf/cm$^2$. As a result, a load is applied to the plurality of unit cells 10 and the plurality of spacers 40 from the arrangement direction X, and the cell pack 1 is integrally held. In the present embodiment, a restraining mechanism is configured of the end plates 50A, 50B, the plurality of restraining bands 52, and the plurality of screws 54. However, the restraining mechanism is not limited to this configuration.

Figure 2:
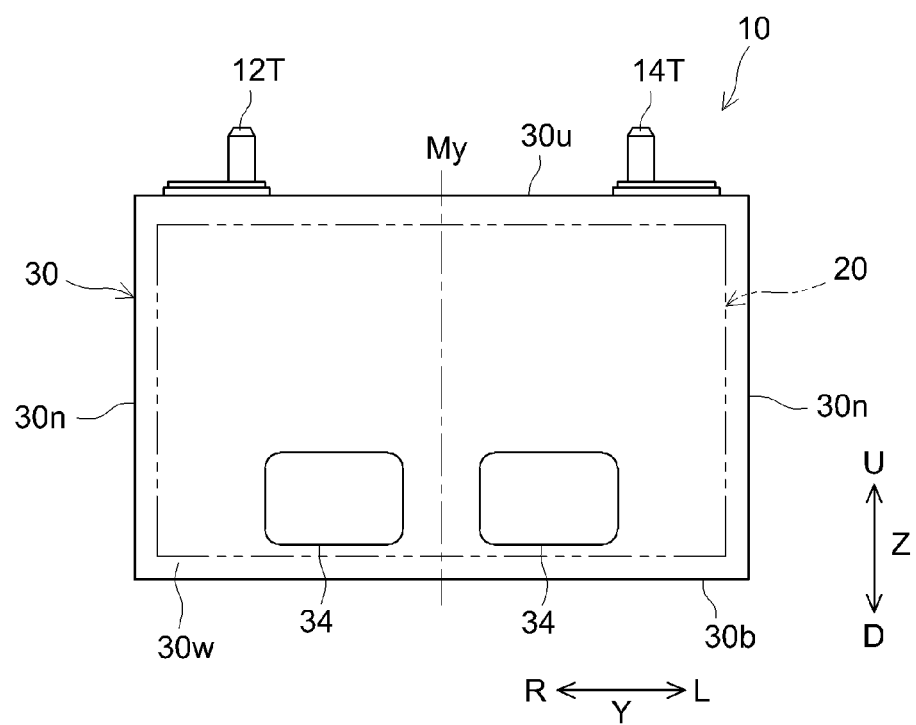
FIG. 2 is a plan view schematically illustrating a unit cell depicted in FIG. 1.
Figure 3:
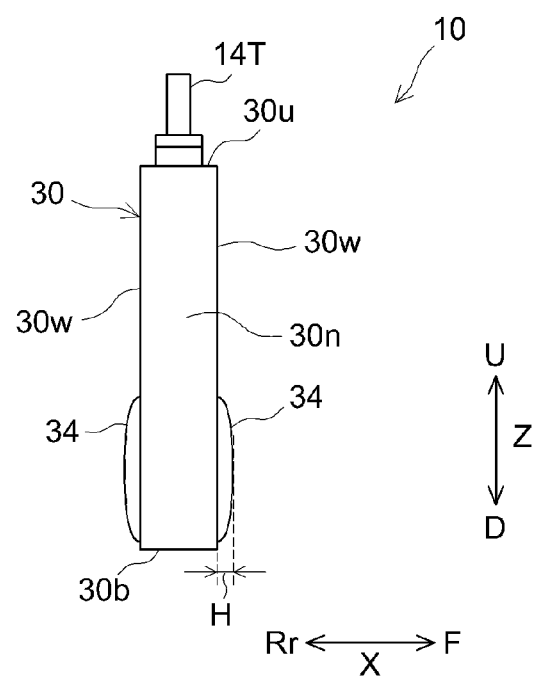
FIG. 3 is a side view schematically illustrating the unit cell depicted in FIG. 1.
Figure 4:
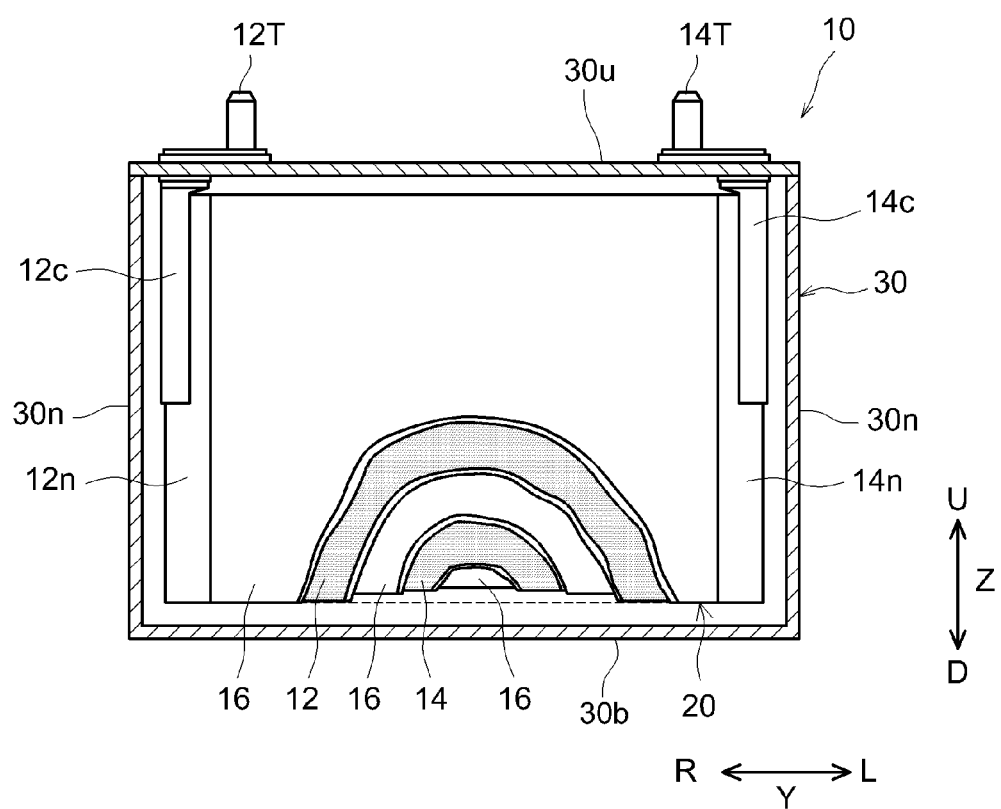
FIG. 4 is a vertical sectional view schematically illustrating the unit cell depicted in FIG. 1.

FIG. 2 is a plan view schematically illustrating the unit cell 10. FIG. 3 is a side view schematically illustrating the unit cell 10. FIG. 4 is a vertical sectional view schematically illustrating the unit cell 10. The unit cell 10 is typically a secondary cell that can be repeatedly charged and discharged, for example, a lithium ion secondary cell, a nickel metal hydride cell, an electric double layer capacitor, or the like. The unit cell 10 includes an electrode body 20, an electrolytic solution (not shown), and a cell case 30.

The cell case 30 is a housing for accommodating the electrode body 20 and the electrolytic solution. The cell case 30 is made of a metal, for example, such as aluminum or steel. The cell case 30 of the present embodiment has a bottomed square shape (rectangular parallelepiped shape).

The cell case 30 has an upper surface 30u, a bottom surface 30b facing the upper surface 30u, and a pair of short side surfaces 30n and a pair of long side surfaces 30w as side surfaces continuing from the bottom surface 30b. The bottom surface 30b, the pair of short side surfaces 30n, and the pair of long side surfaces 30w are formed, for example, from one metal plate by drawing. The pair of short side surfaces 30n and the pair of long side surfaces 30w each have a flat portion. The thickness (plate thickness) of the bottom surface 30b, the pair of short side surfaces 30n and the pair of long side surfaces 30w is about 1 mm or less, typically 0.5 mm or less, for example 0.3 mm to 0.4 mm. The pair of long side surfaces 30w of the cell case 30 face the respective spacers 40. Two pairs of long sides 30w are each provided with two expanding portions 34. The cell case 30 has a total of four expanding portions 34. The expanding portion 34 has a shape along the spacer 40. In other words, the shape, size, arrangement, and the like of the expanding portion 34 are determined on the basis of the relative relationship with the spacer 40. This will be described later in detail.

A liquid pouring port (not shown) for pouring the electrolytic solution is provided on the upper surface 30u of the cell case 30. A positive electrode terminal 12T and a negative electrode terminal 14T for external connection protrude on the upper surface 30u of the cell case 30. The positive electrode terminal 12T and the negative electrode terminal 14T of the adjacent unit cells 10 are electrically connected by a bus bar 18. As a result, the unit cells in the cell pack 1 are electrically connected in series. However, the shape, size, number, arrangement, connection method, and the like of the unit cells 10 constituting the cell pack 1 are not limited to the embodiments disclosed herein, and can be appropriately changed.

The configuration of the electrode body 20 and the electrolytic solution accommodated in the cell case 30 may be the same as the conventional one and is not particularly limited. The electrolytic solution is, for example, a nonaqueous electrolytic solution including a nonaqueous solvent and a supporting salt. The nonaqueous solvent is, for example, a carbonate such as ethylene carbonate (EC), dimethyl carbonate (DMC), ethyl methyl carbonate (EMC) or the like. The supporting salt is, for example, a lithium salt such as $LiPF_6$, $LiBF_4$ or the like.

Figure 5:
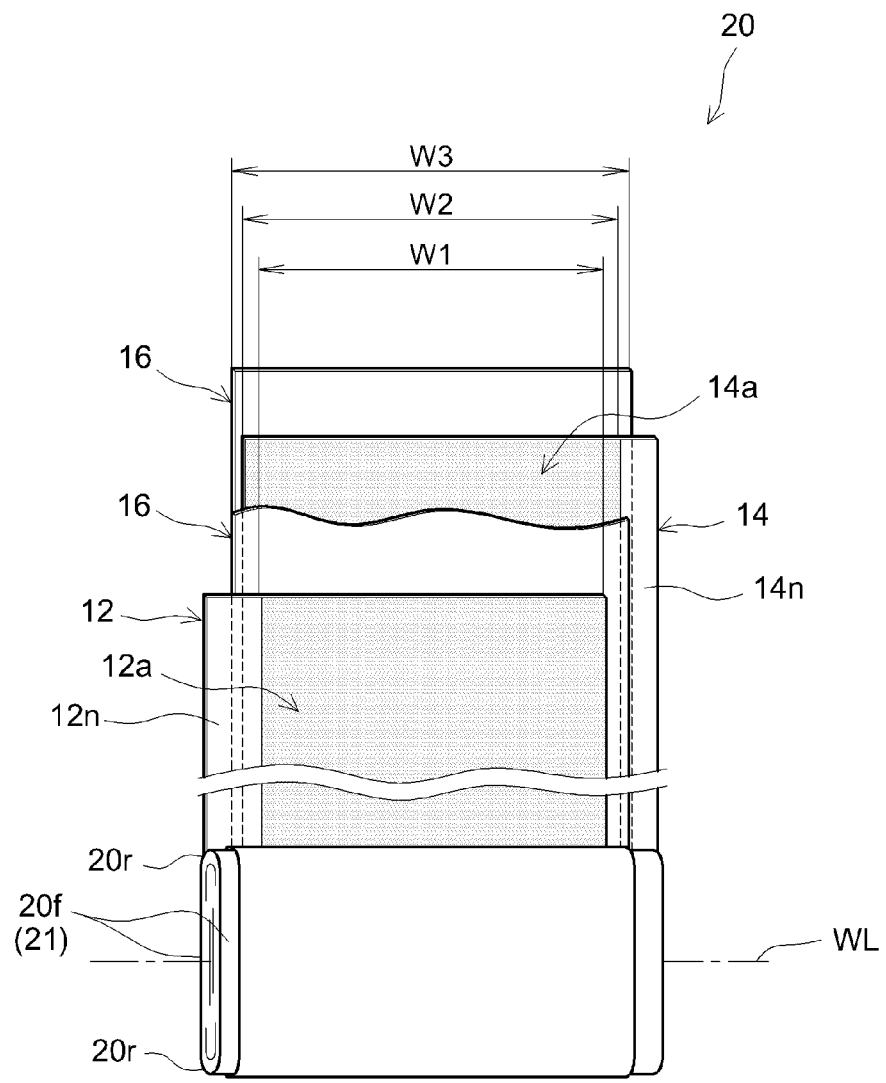
FIG. 5 is an exploded view schematically illustrating an electrode body depicted in FIG. 4.

FIG. 5 is an exploded view schematically illustrating an electrode body 20. The electrode body 20 is a wound electrode body. The electrode body 20 is configured by laminating a belt-shaped positive electrode 12 and a belt-shaped negative electrode 14 in a state of being insulated with a belt-shaped separator 16 interposed therebetween and then winding the laminate around a winding axis WL as a center.

The positive electrode 12 includes a positive electrode current collector and a positive electrode active material layer 12a fixedly attached to the surface of the positive electrode collector. The positive electrode active material layer 12a includes a positive electrode active material capable of reversibly occluding and releasing charge carriers, for example, a lithium transition metal composite oxide. The negative electrode 14 includes a negative electrode current collector and a negative electrode active material layer 14a fixedly attached to the surface of the negative electrode current collector. The negative electrode active material layer 14a includes a negative electrode active material capable of reversibly occluding and releasing charge carriers, for example, a carbon material. The separator 16 is a porous member that transmits the charge carriers and insulates the positive electrode active material layer 12a and the negative electrode active material layer 14a from each other.

In the width direction Y of the electrode body 20, a width W3 of the separator 16 is wider than a width W1 of the positive electrode active material layer 12a and a width W2 of the negative electrode active material layer 14a. The width W2 of the negative electrode active material layer 14a is wider than the width W1 of the positive electrode active material layer 12a. That is, W1, W2, and W3 satisfy W1<W2<W3. In the range of the width W1 of the positive electrode active material layer 12a, the positive electrode active material layer 12a and the negative electrode active material layer 14a face each other in a state of insulation from each other.

At the right end portion of the electrode body 20 in the width direction Y, a positive electrode current collector exposed portion 12n is provided. A positive electrode current collector plate 12c for foil collecting and collecting current is attached to the positive electrode current collector exposed portion 12n. The positive electrode 12 of the electrode body 20 is electrically connected to the positive electrode terminal 12T by the positive electrode current collector plate 12c. Further, at the left end portion of the electrode body 20 in the width direction Y, a negative electrode current collector exposed portion 14n is provided. A negative electrode current collector plate 14c for foil collecting and collecting current is attached to the negative electrode current collector exposed portion 14n. The negative electrode 14 of the electrode body 20 is electrically connected to the negative electrode terminal 14T by the negative electrode current collector plate 14c.

The electrode body 20 has a flat external shape. In a cross-sectional view orthogonal to a winding axis WL, the electrode body 20 has a pair of wound flat portions 20f and a pair of wound R portions 20r interposed between the pair of wound flat portions 20f. A pair of end portions of the electrode body 20 in the width direction Y is opened, and the inside and the outside of the electrode body 20 communicate with each other at the end portions in the width direction Y.

In the unit cell 10, one of the pair of wound R portions 20r of the electrode body 20 is disposed on the bottom surface 30b of the cell case 30, and the other is disposed on the upper surface 30u of the cell case 30. In other words, the pair of wound R portions 20r of the electrode body 20 are arranged one above the other in the vertical direction Z. The pair of end portions of the electrode body 20 in the width direction Y are arranged to face the pair of short side surfaces 30n of the cell case 30. The pair of wound flat portions 20f of the electrode body 20 are arranged to face the pair of long side surfaces 30w of the cell case 30. In other words, the pair of wound flat portions 20f of the electrode body 20 are arranged along the arrangement direction X.

In the present embodiment, the range of the width W1 of the positive electrode active material layer 12a of the wound flat portion 20f is the chargeable/dischargeable reaction portion 21. In the reaction portion 21, the positive electrode active material layer 12a of the positive electrode 12 and the negative electrode active material layer 14a of the negative electrode 14 face each other in the arrangement direction X with the separator 16 being interposed therebetween.

Figure 6:
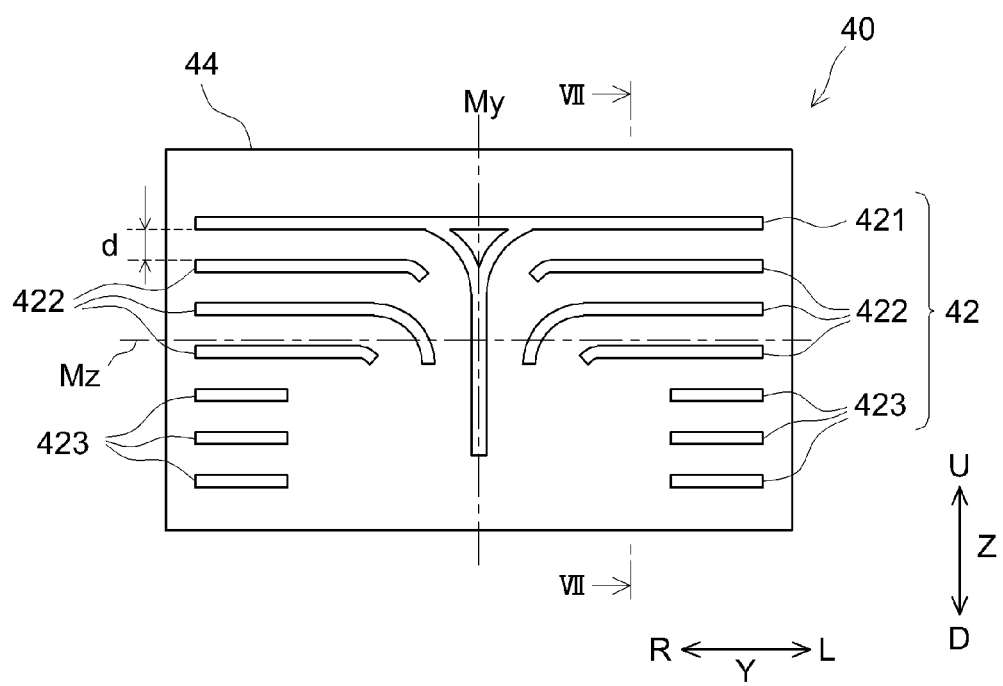
FIG. 6 is a plan view schematically illustrating a spacer depicted in FIG. 1.
Figure 7:
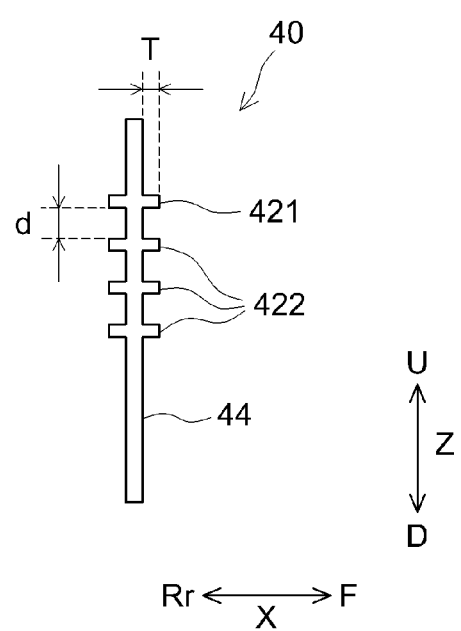
FIG. 7 is a sectional view of the spacer taken along the line VII-VII.

FIG. 6 is a plan view schematically illustrating the spacer 40. FIG. 7 is a sectional view of the spacer 40 taken along the line VII-VII. The spacer 40 is a plate-shaped member. The spacer 40 is made of, for example, a resin material such as polypropylene (PP) or polyphenylene sulfide (PPS) or a metal material having good thermal conductivity. The spacer 40 faces the unit cell 10 and has a function of a heat radiating plate for efficient dissipation of heat generated inside the unit cell 10.

The spacer 40 has a plurality of protruding portions 42 and one base portion 44 on at least one surface thereof facing the cell case 30 of the unit cell 10. The plurality of protruding portions 42 and the one base portion 44 are formed integrally. The plurality of protruding portions 42 protrude from the base portion 44 toward the cell case 30. In other words, the plurality of protruding portions 42 protrude in the direction of approaching the cell 10 in the arrangement direction X. The plurality of protruding portions 42 protrude to the same height T. Although not particularly limited, the height T of the protruding portions 42 is typically less than or equal to the thickness of the base portion 44 (that is, the height in the arrangement direction X), and in one example, this height is 2 mm or less, typically 1 mm or less, for example, 0.5 mm to 1 mm.

The plurality of protruding portions 42 are configured to abut against the long side surface 30w of the cell case 30 and to apply a load from the arrangement direction X to the abutted portion of the long side surface 30w and the peripheral portion thereof. The shape, size, and arrangement of the plurality of protruding portions 42 can be appropriately determined according to, for example, required cell characteristics. In the present embodiment, the plurality of protruding portions 42 have line symmetry with respect to the center line My in the width direction Y as a reference. In the plan view, the plurality of protruding portions 42 include three kinds of ribs 421, 422, 423 having different shapes and sizes. The rib 421 is a T-shaped rib. The rib 421 is configured to press the upper part of the reaction portion 21 of the electrode body 20 and the central part of the reaction portion 21 of the electrode body 20 in the width direction Y including the center line My. The ribs 422, 423 are comb-shaped. Each of the ribs 422, 423 has a plurality of ribs equally spaced in the vertical direction Z. The positions of the ribs are separated from each other. Each rib of the ribs 422 extends downward D on the side close to the center line My.

At least parts of the ribs 421, 422, 423 extend along the width direction Y. As a result, a plurality of groove portions usable as flow paths for a cooling fluid (typically air) is formed in the spacer 40. The plurality of groove portions are formed at a pitch d along the width direction Y. Although not particularly limited, the pitch d of the ribs 421, 422, 423 is typically 1 mm to 10 mm, for example, 5 mm to 10 mm. Accordingly, in the reaction portion 21 of the electrode body 20, it is possible to press the portion that faces the groove portion sandwiched between the ribs 421, 422, 423. Both the left and right end portions of the plurality of groove portions in the width direction Y are opened. In the spacer 40, for example, a cooling fluid is supplied from a portion on the lower side in the vertical direction Z which is close to the center line My, and the cooling fluid is discharged from the left and right in the width direction Y.

In the present embodiment, the protruding portions 42 are provided so as to press both end portions in the width direction Y of the reaction portion 21 of the electrode body 20. At both end portions in the width direction Y, the ribs 421, 422, 423 are provided with a length over the entire length in the vertical direction Z. Further, the protruding portions 42 are provided so as to press a central portion including the center line My of the reaction portion 21 of the electrode body 20. In the central portion including the center line My, the rib 421 is provided with a length over the entire length in the vertical direction Z. Further, the protruding portions 42 are provided so as to press a central portion including the center line Mz in the vertical direction Z of the reaction portion 21 of the electrode body 20. In the central portion including the center line Mz, the ribs 422 are provided with a length over the entire length in the vertical direction Z.

In the present embodiment, the protruding portions 42 are provided so as not to press at least a part of the lower portion of ⅓ from the lower end of the reaction portion 21 of the electrode body 20 in the vertical direction Z. The protruding portions 42 may be provided so as not to press ½ (50%) or more, for example, ¾ (75%) or more, of the width W1 of the reaction portion 21 in the lower portion. This makes it possible to improve the high-rate cycle characteristics better.

Figure 8:
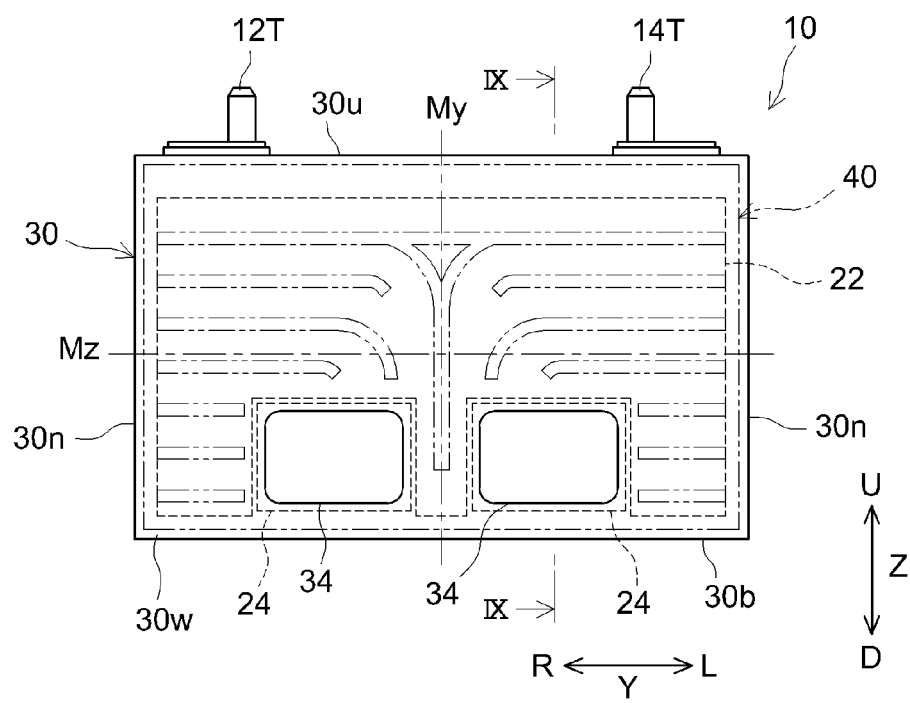
FIG. 8 is a plan view schematically illustrating a relative relationship between the unit cell and the spacer.
Figure 9:
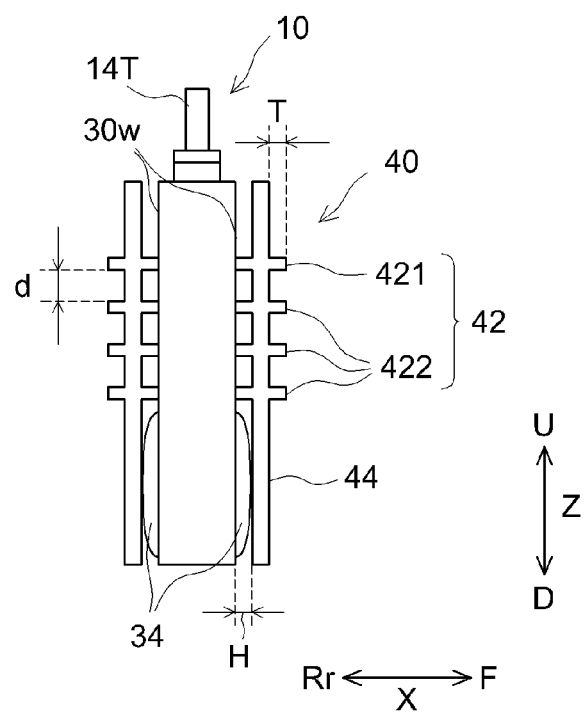
FIG. 9 is a cross-sectional view taken along the line IX-IX and schematically illustrating the relative relationship between the unit cell and the spacer depicted in FIG. 8.

FIG. 8 is a plan view schematically illustrating a relative relationship between the unit cell 10 and the spacer 40. Here, the spacer 40 is represented by a virtual line. FIG. 9 is a cross-sectional view of the unit cell 10 taken along the line IX-IX. However, the internal structure of the unit cell 10 is omitted. As shown in FIGS. 8 and 9, with the technique disclosed herein, the protruding portions 42 of the spacer 40 are in contact with parts of the long side surface 30w of the cell case 30. Accordingly, the long side surface 30w is partitioned into a pressing region 22 pressed by the spacer 40 and a non-pressing region 24 not pressed by the spacer 40. The balance and arrangement between the pressing region 22 and the non-pressing region 24 are determined by a relative relationship with the spacer 40.

The pressing region 22 is a region provided so as to press the reaction portion 21 of the electrode body 20. The pressing region 22 is provided in an upper portion down to ⅓ from the upper end toward the lower end in the vertical direction Z and in a central portion including the center line Mz. The pressing region 22 may be provided over the entire upper portion and/or central portion in the vertical direction Z, or may be provided only in a part thereof. The pressing region 22 provided in the central portion in the vertical direction Z is effective for suppressing wear deterioration. That is, the pressing region 22 provided in the central portion in the vertical direction Z functions to suppress expansion and buckling of the electrode body 20. This makes it possible to suppress the increase in distance between the positive electrode 12 and the negative electrode 14 and stably maintain the positional relationship between the positive electrode 12 and the negative electrode 14 in the arrangement direction X. As a result, it is possible to suitably suppress the increase in resistance also during, for example, high-rate charging and discharging. Therefore, film formation caused by increase in resistance is unlikely to occur and excellent wear deterioration durability can be realized.

The pressing region 22 has line symmetry with respect to the center line My in the width direction Y as a reference. The pressing region 22 is provided at both end portions of the long side surface 30w and at a central portion including the center line My in the width direction Y. The pressing region 22 may be provided over the entire length in the vertical direction Z of the reaction portion 21 at both end portions and/or the central portion, or may be provided with a length shorter than the entire length.

The pressing region 22 provided at both end portions in the width direction Y is effective for improving high-rate cycle characteristics. That is, the pressing region 22 provided at both end portions in the width direction Y functions as a stopper wall that suppresses the movement of the electrolytic solution in the width direction Y. As a result, in the cell pack 1, the electrolytic solution can be suitably stored inside the electrode body 20. Therefore, in the cell pack 1, the electrolytic solution is unlikely to be pushed outside the system of the electrode body 20 even when high-rate charging/discharging is repeated, and excellent high-rate cycle characteristics can be realized. Further, when the unit cell 10 is charged and discharged, dimensional changes of the electrode body 20 in the arrangement direction X are unlikely to occur, and cell bulging can be suitably suppressed. Further, for example, at the time of overcharging, displacement and shrinkage of the separator 16 can be suitably suppressed, and excellent overcharge tolerance can be realized.

In order to exert the above-described effect at a higher level, the pressing regions 22 provided at both end portions in the width direction Y may be provided over the entire length in the vertical direction Z of the reaction portion 21. Further, the pressing region 22 provided in the central portion in the width direction Y may be provided over the entire length in the vertical direction Z of the reaction portion 21.

The non-pressing region 24 is a region provided so as not to press the reaction portion 21 of the electrode body 20. The non-pressing region 24 is provided in a lower portion up to ⅓ from the lower end toward the upper end in the vertical direction Z. The non-pressing region 24 may be provided over the entire lower portion in the vertical direction Z or may be provided only in a part thereof.

The non-pressing region 24 provided in the lower portion in the vertical direction Z is effective for improving high-rate cycle characteristics. That is, the non-pressing region 24 provided in the lower portion in the vertical direction Z functions as a liquid holding space for holding the electrolytic solution in the reaction portion 21. Thus, in the cell pack 1, it is possible to suitably store the electrolytic solution inside the electrode body 20. Therefore, in the cell pack 1, the electrolytic solution is unlikely to be pushed outside the system of the electrode body 20 even when high-rate charging/discharging is repeated, and excellent high-rate cycle characteristics can be realized.

In order to exert the above effect at a higher level, the pressing region 22 provided in the lower portion in the vertical direction Z may be provided over ½ (50%) or more, for example, ¾ (75%) or more, of the entire lower portion of the reaction portion 21.

The non-pressing region 24 has line symmetry with respect to the center line My in the width direction Y as a reference. The non-pressing region 24 is provided in the left and right regions partitioned by the center line My in the width direction Y.

In the technique disclosed herein, the non-pressing region 24 is provided with the expanding portion 34 that protrudes in the arrangement direction X. The expanding portion 34 is provided so as to follow the shape of the spacer 40. As a result, the gap between the non-pressing region 24 of the cell case 30 and the spacer 40 is narrowed. The gap between the non-pressing region 24 of the cell case 30 and the spacer 40 may be completely filled. Here, the expanding portion 34 has a hill-shaped cross section. With such a sectional shape, the height in the arrangement direction X continuously increases from the flat portion of the long side surface 30w. Therefore, it is possible to effectively disperse the stress. However, the cross-sectional shape of the expanding portion 34 is not limited to a hill shape, and may be, for example, a polygonal shape such as a semicircular shape or a trapezoidal shape. Further, for example, the expanding portion 34 may have a shape having a plurality of points with the maximum height H, for example, a wavy shape, a grainy shape, or the like.

The expanding portion 34 protrudes from the flat portion of the long side surface 30w of the cell case 30 toward the base portion 44 of the opposing spacer 40 at the maximum height H. The maximum height H of the expanding portion 34 is equal to or less than the height T of the protruding portion 42 of the spacer 40. Although not particularly limited, the maximum height H of the expanding portion 34 is, in one example, 2 mm or less, typically 1 mm or less, for example, 0.5 mm to 1 mm. In some embodiments, the maximum height H of the expanding portion 34 is the same as the height T of the protruding portion 42 of the spacer 40. That is, as shown in FIG. 9, when the unit cell 10 is in a fully discharged state (SOC=0%), the expanding portion 34 of the cell case 30 may be in contact with the base portion 44 of the spacer 40. Thus, the effect of the technology disclosed herein can be exerted at a higher level.

As described above, in the cell pack 1, the expanding portion 34 is provided in the non-pressing region 24 of the cell case 30. This makes it possible to disperse the stress caused by the internal pressure fluctuation in the cell case 30. When internal pressure fluctuation occurs in the cell case 30, the volume change of the non-pressing region 24 can be suppressed. As a result, even when the stress caused by internal pressure fluctuation is repeatedly applied to the cell case 30, degradation such as cracks is unlikely to occur in the cell case 30. This makes it possible, for example, to prevent the electrolytic solution accommodated in the cell case 30 from flowing out, and to suppress the penetration of moisture or the like into the cell case 30. Therefore, it is possible to realize the cell pack 1 having excellent durability against internal pressure fluctuations.

The cell pack 1 can be used for various purposes. The cell pack 1 can be suitably used, for example, as a power source (driving power source) for a motor installed on a vehicle. Types of vehicles are not particularly limited, but typically include automobiles such as plug-in hybrid vehicles (PHV), hybrid vehicles (HV), electric vehicles (EV), and the like.

Method for Producing Single Cell

The unit cells 10 constituting the cell pack 1 can be produced by a conventionally known production method. Although not particularly limited, from the viewpoint of low cost and productivity, for example, the following production method can be used. The production method includes, for example, the following three steps: a first step of constructing an assembled body by inserting the electrode body 20 into the cell case 30; a second step of restraining the assembled body in a state in which the assembled body faces the spacer 40 and applying a pressure to the interior of the cell case 30, thereby forming the expanding portion 34; and a third step of injecting the electrolytic solution into the cell case 30.

In the first step, initially, the cell case 30 and the electrode body 20 are prepared. As the cell case 30 and the electrode body 20, conventionally known ones can be appropriately used. Although not particularly limited, for example, a case configured by combining a case main body formed by drawing from one metal sheet and having an opening and a lid body for closing the opening of the case main body can be used as the cell case 30. For example, a wound electrode body such as described above can be used as the electrode body 20. In this step, next, the electrode body 20 is inserted into the cell case 30. In this way, an assembled body is constructed.

In the second step, initially, the assembled body is restrained in a state of facing the spacer 40. A spacer same as that of the cell pack 1 can be used as the spacer 40. The restraining pressure may be the same as that of the cell pack 1. In this step, next, a pressure is applied to the interior of the cell case 30. The application of pressure may be carried out, for example, by using the liquid pouring port provided in the upper surface 30$u$ of the cell case 30. The applied pressure may be suitably adjusted so that the cell case 30 bulges. For example, when the cell case 30 is made of aluminum having a thickness of about 0.3 mm to 0.4 mm, a pressure may be applied so that the internal pressure of the cell case 30 is approximately 3 atm to 4 atm. As a result, the expanding portion 34 along the shape of the spacer 40 is formed on the surface of the cell case 30 that faces the spacer 40. Then, typically, the restraint of the assembled body is released.

In the third step, initially, an electrolytic solution is prepared. For example, a solution in which a supporting salt is contained in a nonaqueous solvent, such as described above, can be used as the electrolytic solution. In this step, next, the electrolytic solution is introduced from the injection port provided in the upper surface 30$u$ of the cell case 30. Then, the injection port is hermetically sealed. In this manner, the unit cell 10 can be produced. Further, the cell pack 1 can be manufactured by alternately arranging the produced unit cells 10 and the spacers 40 used in the second step in a predetermined direction and then restraining by the restraining mechanism.

Although the present disclosure has been described in detail, the above-described embodiment is merely an example, and the disclosure disclosed herein is inclusive of various modifications and changes of the above specific examples.

For example, in the above-described embodiment, the electrode body 20 is a wound electrode body, but this configuration is not limiting. The electrode body 20 may be, for example, a laminated electrode body in which a plurality of rectangular positive electrodes and a plurality of rectangular negative electrodes are alternately laminated in an insulated state. The laminated electrode body has a pair of rectangular flat surfaces and four laminate surfaces (end surfaces) connecting the pair of flat surfaces. Typically, the laminated electrode body is disposed inside the cell case 30 so that the flat surface thereof faces the long side surface 30$w$ of the unit cell 10. In this case, the flat surface serves as the reaction portion 21 of the electrode body 20. The electrode body of such a mode can also be suitably used in the unit cell 10.

Further, for example, in the above-described embodiment, each of the pair of long side surfaces 30$w$ of the cell case 30 is partitioned into the pressing region 22 and the non-pressing region 24 and has the expanding portion 34. However, this configuration is not limiting. That is, as described above, the partition of the pressing region 22 and the non-pressing region 24 is determined by the relative relationship with the spacer 40. Therefore, for example, when one of the pair of long side surfaces 30$w$ of the cell case 30 faces the spacer having such a shape as to press the entire long side surface 30$w$, the opposing surface may have only the pressing region 22. Further, the expanding portion 34 may be provided on at least one of the pair of long side surfaces 30$w$ of the cell case 30.

Figure 10:
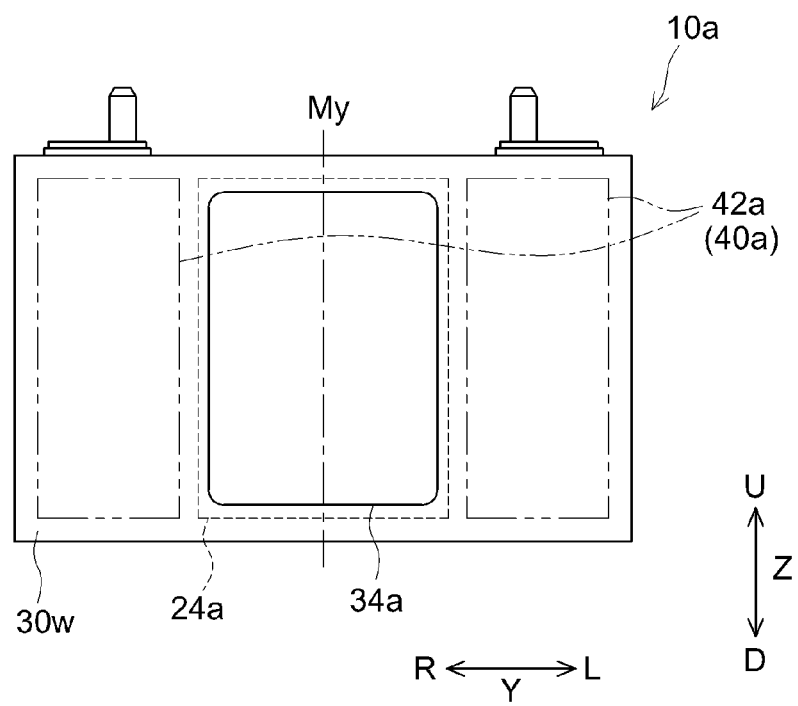
FIG. 10 is a plan view schematically illustrating a relative relationship between a unit cell and a spacer according to another embodiment.
Figure 11:
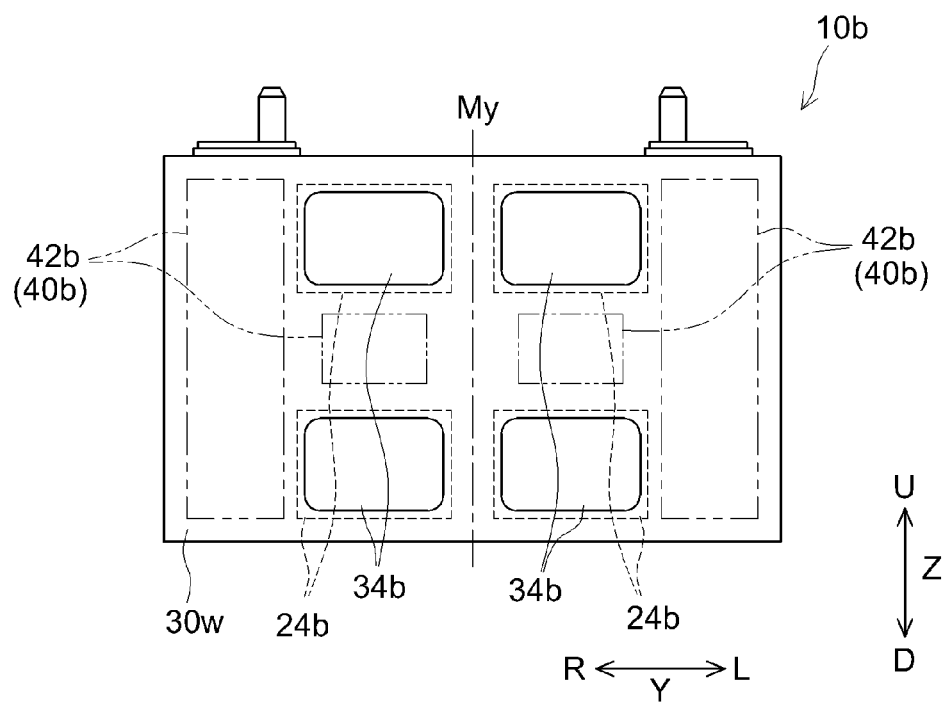
FIG. 11 is a plan view schematically illustrating a relative relationship between a unit cell and a spacer according to another embodiment.
Figure 12:
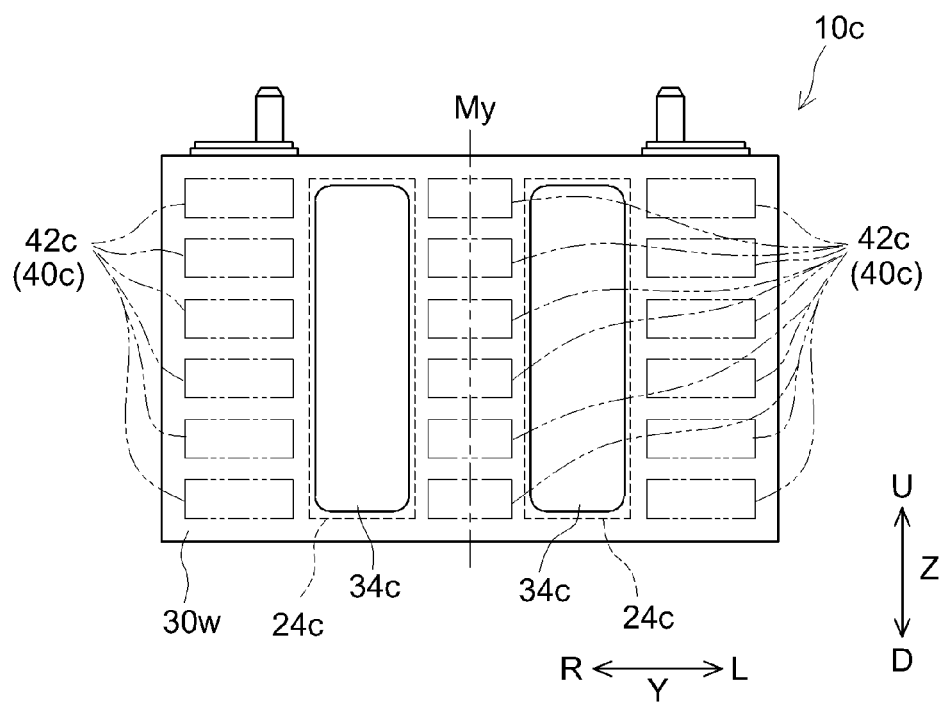
FIG. 12 is a plan view schematically illustrating a relative relationship between a unit cell and a spacer according to another embodiment.

Further, for example, in the above-described embodiment, two expanding portions 34 are provided on the long side surface 30$w$ of the cell case 30. Furthermore, in the above-described embodiment, the expanding portion 34 is provided only in the lower portion of the long side surface 30$w$ of the cell case 30. However, this configuration is not limiting. FIGS. 10 to 12 are plan views schematically illustrating the relative relationship between the unit cells 10$a$ to 10$c$ and the protruding portions 42$a$ to 42$c$ of the spacers 40$a$ to 40$c$ according to another embodiment. In FIGS. 10 to 12, the protruding portions 42$a$ to 42$c$ are represented by virtual lines.

FIG. 10 shows an example in which the spacer 40$a$ facing the long side surface 30$w$ of the unit cell 10$a$ has two first protruding portions 42$a$ in a flat plate shape. The two first protruding portions 42$a$ are provided so as to press both end portions in the width direction Y of the reaction portion of the electrode body along a length over the entire length in the vertical direction Z. For this reason, in FIG. 10, one non-pressing region 24$a$ is provided in the central portion including the center line My in the width direction Y along a length over the entire length in the vertical direction Z. In the non-pressing region 24$a$, an expanding portion 34$a$ is provided with a length over the entire length in the vertical direction Z. The unit cell 10$a$ and the spacer 40$a$ of such a mode can also be suitably used like the unit cell 10 and the spacer 40.

FIG. 11 illustrates an example in which a spacer 40$b$ facing a long side surface 30$w$ of a unit cell 10$b$ has four second protruding portions 42$b$ in a flat plate shape. Of the four second protruding portions 42b, the two second protruding portions 42b are provided so as to press both end portions in the width direction Y of the reaction portion of the electrode body along a length over the entire length in the vertical direction Z. The remaining two second protruding portions 42b are provided so as to press the central portion including the center point with respect to the left and right regions partitioned by the center line My in the width direction Y. Therefore, in FIG. 11, a total of four non-pressing regions 24b are provided above and below in the vertical direction Z so as to sandwich the second protruding portion 42b pressing the central portion. Each non-pressing region 24b is provided with the respective expanding section 34b. The unit cell 10b and the spacer 40b of such a mode can also be suitably used like the unit cell 10 and the spacer 40.

FIG. 12 illustrates an example in which a spacer 40c facing the long side surface 30w of a unit cell 10c is formed in a regular uneven shape (comb shape). The spacer 40c has a plurality of third protruding portions 42c arranged at equal intervals in the vertical direction Z. The plurality of third protruding portions 42c extend along the width direction Y. The plurality of third protruding portions 42c are provided so as to press both end portions and the central portion in the width direction Y of the reaction portion along a length over the entire length in the vertical direction Z. Therefore, in FIG. 12, two non-pressing regions 24c are provided with a length over the entire length in the vertical direction Z between both end portions and the central portion in the width direction Y where the third protruding portions 42c are provided. Each of the two non-pressing regions 24c is provided with an expanding portion 34c with a length over the entire length in the vertical direction Z. The unit cell 10c and the spacer 40c of such a mode can also be suitably used like the unit cell 10 and the spacer 40.

Figure 13:
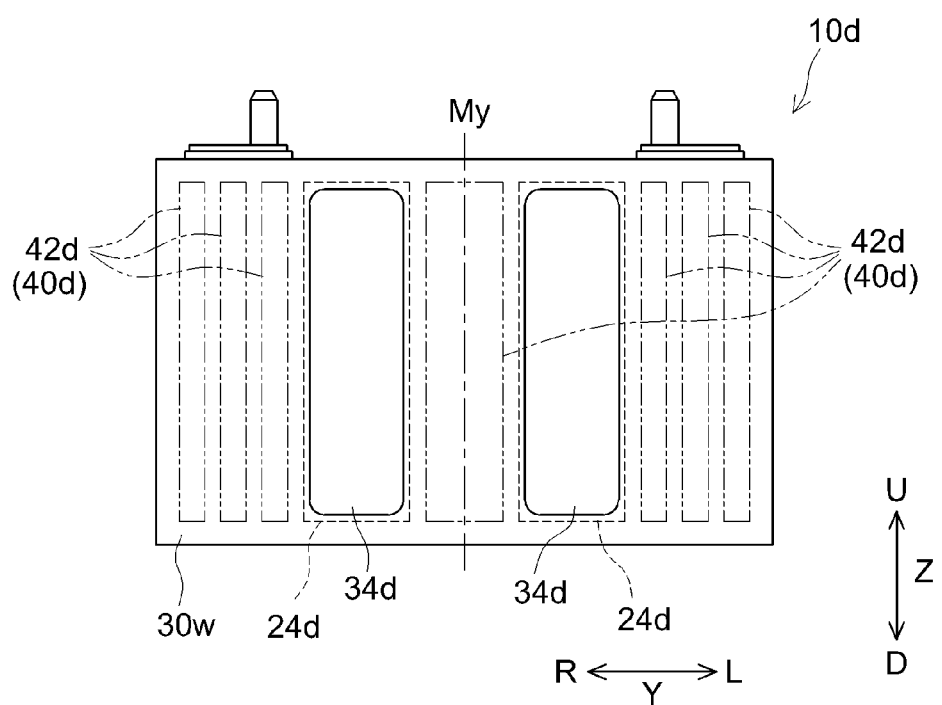
FIG. 13 is a plan view schematically illustrating a relative relationship between a unit cell and a spacer according to another embodiment.

Further, for example, in the above-described embodiment, the ribs 421, 422, 423 extend in the width direction Y, but such a configuration is not limiting. FIG. 13 illustrates an example in which the spacer 40d facing the long side surface 30w of a unit cell 10d is formed in a regular uneven shape (comb shape). The spacer 40d has a plurality of fourth protruding portions 42d arranged at equal intervals in the width direction Y. Each of the plurality of fourth protruding portions 42d extends in the vertical direction Z. Like the third protruding portions 42c, the plurality of fourth protruding portions 42d are provided so as to press both end portions and the central portion in the width direction Y of the reaction portion with a length over the entire length in the vertical direction Z. Therefore, in FIG. 13, two non-pressing regions 24d having the same shape as in FIG. 12 are provided at the same positions as in FIG. 12. Further, the two non-pressing regions 24d are each provided with an expanding portion 34d. The unit cell 10d and the spacer 40d of such a mode can also be suitably used like the unit cell 10 and the spacer 40.

The terms and expressions used herein are for description only and are not to be interpreted in a limited sense. These terms and expressions should be recognized as not excluding any equivalents to the elements shown and described herein and as allowing any modification encompassed in the scope of the claims. The embodiments disclosed herein may be embodied in many various forms. This disclosure should be regarded as providing embodiments of the principle of the disclosure. These embodiments are provided with the understanding that they are not intended to limit the disclosure to the embodiments described in the specification and/or shown in the drawings. The disclosure is not limited to the embodiments described herein. The disclosure disclosed herein encompasses any of embodiments including equivalent elements, modifications, deletions, combinations, improvements and/or alterations which can be recognized by a person of ordinary skill in the art based on the disclosure. The elements of each claim should be interpreted broadly based on the terms used in the claim, and should not be limited to any of the embodiments described in this specification or used during the prosecution of the present application.

What is claimed is:

1. A cell pack comprising:
    a plurality of unit cells arranged in an arrangement direction, each unit cell including an electrode body having a positive electrode and a negative electrode, an electrolytic solution, and a cell case accommodating the electrode body and the electrolytic solution;
    one or a plurality of spacers which is disposed between each pair of two unit cells adjacent to each other in the arrangement direction and has a protruding portion protruding toward the unit cell on each surface facing the unit cell; and
    a restraining mechanism that applies a load from the arrangement direction to the plurality of unit cells and the one or plurality of spacers, wherein
    each cell case has a first side surface facing an adjacent spacer, and a second side surface opposite the first side surface, the second side surface facing another adjacent spacer,
    the first side surface has a pressing region pressed by the adjacent spacer and a non-pressing region not pressed by the adjacent spacer,
    the second side surface has a pressing region pressed by the another adjacent spacer and a non-pressing region not pressed by the another adjacent spacer,
    a first expanding portion bulging from a flat portion on the first side surface in a direction of approaching the adjacent spacer is provided in the non-pressing region of the first side surface of each cell case,
    a second expanding portion bulging from a flat portion on the second side surface in a second direction of approaching the another adjacent spacer is provided in the non-pressing region of the second side surface of each cell case, and
    a first gap between each cell case and the adjacent spacer is reduced by the first expanding portion, and a second gap between each cell case and the another adjacent spacer is reduced by the second expanding portion.

2. The cell pack according to claim 1, wherein
    the electrode body has a reaction portion in which the positive electrode and the negative electrode face each other in the arrangement direction in a state of insulation from each other, and
    the non-pressing region of the first side surface of each cell case is provided at least in a lower portion up to ⅓ from a lower end toward an upper end of the reaction portion in a vertical direction.

3. The cell pack according to claim 2, wherein the pressing region of the first side surface of each cell case is provided with a length such that, when a direction orthogonal to a vertical direction of the first side surface is taken as a width direction, both end portions in the width direction of the reaction portion are pressed over the entire length in the vertical direction.

4. The cell pack according to claim 1, wherein
    a maximum height of the first expanding portion is the same as a height of the protruding portion of the adjacent spacer, and the first expanding portion of each cell case is in contact with the adjacent spacer when the unit cell is in a predetermined fully discharged state.

5. The cell pack according to claim 1, wherein
the electrode body is a wound electrode body of a flat shape which is obtained by laminating the positive electrode and the negative electrode in a state of insulation from each other and winding the laminate,
the wound electrode body has a pair of wound flat portions and a pair of wound R portions interposed between the pair of wound flat portions, and
one of the pair of wound R portions is disposed on a lower side in a vertical direction, and the pair of wound flat portions are arranged along the first side surface of each cell case.

6. The cell pack according to claim 1, wherein
a thickness of each of the first side surface and the second side surface of each cell case is 0.5 mm or less.

7. A method for producing a unit cell to be used in constructing a cell pack that includes: a plurality of unit cells arranged in an arrangement direction, each unit cell including an electrode body having a positive electrode and a negative electrode, an electrolytic solution, and a cell case accommodating the electrode body and the electrolytic solution; one or a plurality of spacers which is disposed between two unit cells adjacent to each other in the arrangement direction and has a protruding portion protruding toward the unit cell on at least one surface facing the unit cell; and a restraining mechanism that applies a load from the arrangement direction to the plurality of unit cells and the one or plurality of spacers,
the method comprising:
a first step of constructing an assembled body by inserting the electrode body into the cell case;
a second step of, subsequent to the first step, restraining the assembled body in a state where the assembled body faces the spacer, and applying a pressure to an interior of the cell case, thereby forming, in the cell case, an expanding portion along a shape of the spacer; and
a third step of, subsequent to the second step, injecting the electrolytic solution into the cell case in which the expanding portion has been formed.

8. A cell pack comprising:
a plurality of unit cells arranged in an arrangement direction, each unit cell including an electrode body having a positive electrode and a negative electrode, an electrolytic solution, and a cell case accommodating the electrode body and the electrolytic solution;
one or a plurality of spacers which is disposed between each pair of two unit cells adjacent to each other in the arrangement direction and has a protruding portion protruding toward the unit cell on each surface facing the unit cell; and
a restraining mechanism that applies a load from the arrangement direction to the plurality of unit cells and the one or plurality of spacers, wherein
each cell case has a first side surface facing an adjacent spacer, and a second side surface opposite the first side surface, the second side surface facing another adjacent spacer,
the first side surface has a pressing region pressed by the adjacent spacer and a non-pressing region not pressed by the adjacent spacer,
the second side surface has a pressing region pressed by the another adjacent spacer and a non-pressing region not pressed by the another adjacent spacer,
a pair of first expanding portions bulging in a direction of approaching the adjacent spacer is provided in the non-pressing region of the first side surface of each cell case,
a pair of second expanding portions bulging in a second direction of approaching the another adjacent spacer is provided in the non-pressing region of the second side surface of each cell case, and
a first gap between each cell case and the adjacent spacer is reduced by the pair of first expanding portions, and a second gap between each cell case and the another adjacent spacer is reduced by the pair of second expanding portions.

9. The cell pack according to claim 8, wherein
the electrode body has a reaction portion in which the positive electrode and the negative electrode face each other in the arrangement direction in a state of insulation from each other, and
the non-pressing region of the first side surface of each cell case is provided at least in a lower portion up to ⅓ from a lower end toward an upper end of the reaction portion in a vertical direction.

10. The cell pack according to claim 9, wherein the pressing region of the first side surface of each cell case is provided with a length such that, when a direction orthogonal to a vertical direction of the first side surface is taken as a width direction, both end portions in the width direction of the reaction portion are pressed over the entire length in the vertical direction.

11. The cell pack according to claim 8, wherein
a maximum height of the pair of first expanding portions is the same as a height of the protruding portion of the adjacent spacer, and
the pair of first expanding portions of each cell case is in contact with the adjacent spacer when the unit cell is in a predetermined fully discharged state.

12. The cell pack according to claim 8, wherein
the electrode body is a wound electrode body of a flat shape which is obtained by laminating the positive electrode and the negative electrode in a state of insulation from each other and winding the laminate,
the wound electrode body has a pair of wound flat portions and a pair of wound R portions interposed between the pair of wound flat portions, and
one of the pair of wound R portions is disposed on a lower side in a vertical direction, and the pair of wound flat portions are arranged along the first side surface of each cell case.

13. The cell pack according to claim 8, wherein
a thickness of each of the first side surface and the second side surface of each cell case is 0.5 mm or less.

* * * * *